(12) United States Patent
Moroz et al.

(10) Patent No.: US 6,256,691 B1
(45) Date of Patent: *Jul. 3, 2001

(54) UNIVERSAL DOCKING STATION

(75) Inventors: John A. Moroz, Plymouth; Gary A. Altenberg, Buffalo; James Ternus, Maple Grove, all of MN (US)

(73) Assignee: Mobility Electronics Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/481,266

(22) Filed: Jan. 11, 2000

Related U.S. Application Data

(63) Continuation of application No. 09/217,110, filed on Dec. 21, 1998, now abandoned, which is a continuation of application No. 08/679,131, filed on Jul. 12, 1996.
(60) Provisional application No. 60/017,725, filed on May 16, 1996.

(51) Int. Cl.[7] ................................................ G06F 13/00
(52) U.S. Cl. ................................. 710/103; 361/683
(58) Field of Search .......................... 710/103, 101; 713/400, 401, 500; 361/683–686

(56) References Cited

U.S. PATENT DOCUMENTS

| | | | |
|---|---|---|---|
| 5,432,916 | * | 7/1995 | Hahn et al. . |
| 5,579,491 | * | 11/1996 | Jeffries et al. . |
| 5,632,020 | * | 5/1997 | Gephardt et al. ............... 710/103 |
| 5,634,080 | * | 5/1997 | Kikinis et al. ..................... 710/73 |
| 5,941,965 | * | 8/1999 | Moroz et al. ................... 710/101 |
| 6,044,215 | | 3/2000 | Charles et al. ............... 395/500.46 |

* cited by examiner

*Primary Examiner*—Paul R. Myers
(74) *Attorney, Agent, or Firm*—Jackson Walker LLP

(57) ABSTRACT

A universal docking station for coupling a portable computer to a plurality of peripheral devices via a PCMCIA interface is provided, wherein at least one of the peripheral devices is a user input device. The docking station comprises a PCMCIA interface adapted to be coupled to the portable computer, peripheral control units adapted to be coupled to the plurality of peripheral devices, and a docking station control unit coupled to the PCMCIA interface and the peripheral control units, wherein the docking station control unit selectively transfers data between the PCMCIA interface and one of the peripheral control units, and wherein the docking station control unit extends the period of time data written by the computer remains stable on the PCMCIA interface. A computer system including the universal docking station is also provided. A method for interfacing a standard peripheral device to a computer via a PCMCIA bus is also provided.

12 Claims, 6 Drawing Sheets

UNIVERSAL DOCKING STATION

This application is a Continuation of application Ser. No. 09/217,110, filed Dec. 21, 1998, now abandoned, which is a Continuation of application Ser. No. 08/679,131, filed on Jul. 12, 1996, which was an application based on Provisional application Ser. No. 60/017,725, filed May 16, 1996, which application(s) are incorporated herein by reference.

FIELD OF THE INVENTION

The present invention relates generally to computers and more particularly to docking stations used to interface a portable computer to multiple peripheral devices.

BACKGROUND OF THE INVENTION

Though popular, portable computers, such as notebook, laptop or palmtop computers have several shortcomings when compared to conventional desktop computers. They typically include a keyboard that is smaller and more difficult to use than a conventional keyboard, and a smaller, lower resolution screen than a conventional desktop monitor. In addition, portable computers rarely include such peripherals as CD ROMS, tape backups, secondary hard drives, modems, and network connectors.

A portable computer user seeking these features has limited options. The user can purchase separate portable and desk top computers. However, given that the user can only use one computer at a time, this option is costly and requires frequent data transfers between the two computers. A second option is to plug the various peripherals into their designated ports on the portable computer. Unfortunately, most portable computers do not have connectors for many of the peripherals desired. Moreover, separately connecting and unconnecting the various peripherals is time consuming and burdensome.

A third option for the portable computer user seeking to expand the capabilities of their portable computer is to purchase a docking station or expansion base into which the particular portable computer may easily be docked during desktop use. Thus, only one computer is necessary, and data transfer is not required. The docking station typically sits on the user's desk and provides connections to various peripheral devices, such as full-size keyboards and monitors, modems, network connectors, etc. Once the portable computer is docked in the docking station, the portable computer has access to all of the various peripherals attached to the docking station. When travel is necessary, the user can simply remove the portable computer from the docking station and carry it with him on the road.

A major shortcoming of current docking stations is their reliance on proprietary connectors to connect the portable computer to the docking station. Consequently, one must purchase the docking station that corresponds to the make and model of the portable computer they currently own, and is most likely precluded from using docking stations manufactured by different companies. This severely limits the usefulness of the docking station concept because a portable computer user is confined to a small number of stations into which he can dock his computer. A strong need exists for a universal docking station that provides the added advantages and capabilities of a desktop computer, particularly a full-size keyboard and monitor, but does not require a proprietary connection to the portable computer.

SUMMARY OF THE INVENTION

A universal docking station for connecting a portable computer to a plurality of peripheral devices is provided, wherein at least one of the peripheral devices is a user input device, at least one of the user input devices is capable of receiving a write command, and the portable computer is capable of writing data. The docking station comprises a PCMCIA interface adapted to be coupled to the portable computer, peripheral control units adapted to be coupled to the plurality of peripheral devices, and a docking station control unit coupled to the PCMCIA interface and the peripheral control units, wherein the docking station control unit selectively transfers data between the PCMCIA interface and one of the peripheral control units, and wherein the docking station control unit extends the period of time data written by the computer remains stable on the PCMCIA interface.

A computer system is also provided comprising a portable computer having a PCMCIA interface, the portable computer capable of generating output signals for designated peripheral devices, a control unit having a PCMCIA interface for interfacing with the portable computer PCMCIA interface, a plurality of peripheral devices coupled to the control unit, with at least one of the peripheral devices being a user input device capable of generating input signals, and at least one of the peripheral devices being a display device, the control unit comprising means for converting the output signals from the portable computer into a form compatible with the designated peripheral device, means for routing the converted signal to the designated peripheral device, means for converting the input signal into a form compatible with the portable computer, and means for prioritizing access to the PCMCIA bus by the input signals. In one embodiment, the means for converting the output signal into a form compatible with the designated peripheral comprises extending the period of time the output signal remains stable.

A method for interfacing a standard peripheral device to a computer via a PCMCIA bus is also provided. The method comprises the steps of driving data to be written to the peripheral device on the PCMCIA bus, extending the time the data is available to the peripheral device on the PCMCIA bus for a period sufficient to satisfy the timing requirements of the peripheral device, and writing the data to the peripheral device. In one embodiment, the extending step is accomplished by activating the write signal a period before a standard write signal.

BRIEF DESCRIPTION OF THE DRAWINGS

For a more complete understanding of this invention reference should now be made to the embodiment(s) illustrated in greater detail in the accompanying drawings and described below by way of examples of the invention.

DETAILED DESCRIPTION OF THE PREFERRED EMBODIMENTS

The universal docking station or expansion base of the present invention allows a portable computer user to interface a portable computer to several different peripheral devices, such as CD-ROMs, Hard Disk Drives, Floppy Disk Drives, Tape Backups, standard size keyboards and mice, standard size VGA/super VGA monitors, networks, and other peripherals that typically utilize serial and/or parallel ports.

Rather than using proprietary connectors to connect the computer to the docking station, the present invention accomplishes this task using a standard universal interface. One such interface is the Personal Computer Memory Card International Association ("PCMCIA") slot, port or socket provided on most portable computers. To interface with the PCMCIA slot, the docking station uses a PCMCIA card ("PC Card") as the connection between the portable computer and the docking station. With this arrangement, portable computer users can connect their portable computers to multiple peripherals with one PCMCIA card. Because PCMCIA ports on portable computers are almost identical physically and electrically from computer to computer, the present docking station will work with almost any portable computer having such a port. With this arrangement, the docking station of the present invention can be positioned not only at a user's office and home, but at airports, libraries, business associates' offices, and virtually anywhere else computers are used. Portable computer users would no longer be limited by the make and model of computer they carry.

Background on 16-Bit PCMCIA cards can be found in Mindshare, Inc. & Don Anderson, *PCMCIA System Architecture* 16 *Bit PC Cards, Second Edition* (Addison-Wesley Publishing Company 1995), which is hereby incorporated by reference. Background on 32-bit PCMCIA standard known as "card bus" can be found in Mind Share, Inc., *Card Bus System Architecture* (Addison-Wesley Publishing Company 1995), which is hereby incorporated by reference.

Figure 1:
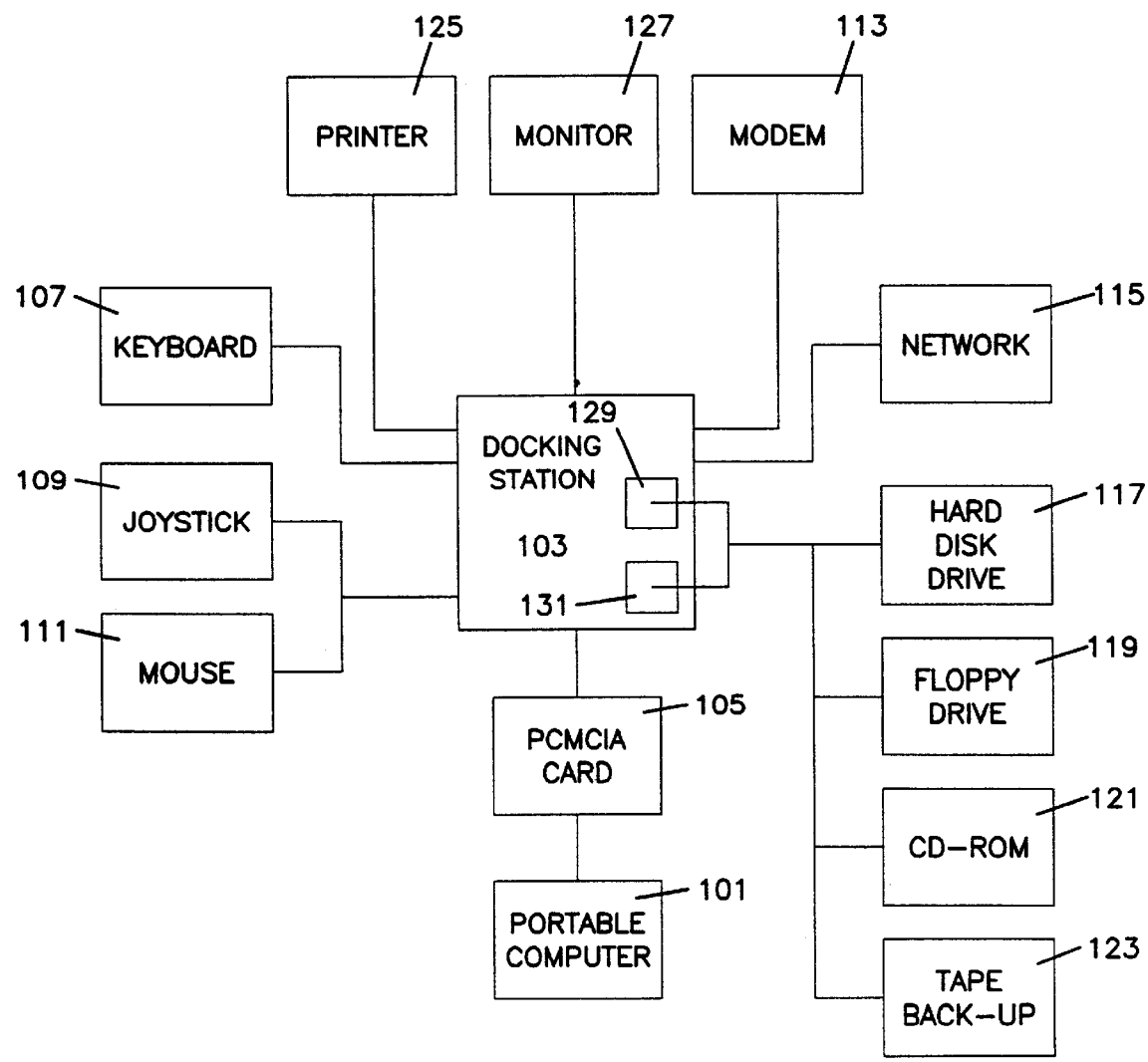
FIG. 1 is a block diagram showing a docking station in accordance with one embodiment of the invention connected to various peripheral devices and connected to a computer via a standard universal interface.

Referring to the drawings, particularly FIG. 1, a portable computer 101 having a PCMCIA port 102 is connected to a PCMCIA card 105 which interfaces to a docking station 103. The PCMCIA card 105 completes the interface between the portable computer 101 and the docking station 103. Several peripheral devices 106 are coupled to the docking station 103. Possible peripheral devices include: keyboard 107, joy stick 109, mouse 111, modem 113, network interface 115, hard disk 117, floppy disk 119, CD ROM 121, tape backup 123, printer 125, and monitor 127.

In one embodiment, the docking station 103 contains two standard expansion slots 129 and 131 configured and arranged to receive any combination of two of the following standard internal peripheral devices: hard disk 117, floppy drive 119, CD ROM 121 and tape backup 123. Other embodiments of the present invention may provide for additional expansion slots for receiving additional internal peripheral devices.

As indicated above, the portable computer 101 contains at least one PCMCIA slot. The portable computer 101 also includes a central processing unit (CPU) coupled to a Read Only Memory (ROM) and Random Access Memory (RAM). The computer communicates with the PCMCIA slot and other internal and external components through an internal or input/output (I/O) bus. A controller or Host Bus Adaptor (HBA) links signals coming from the PCMCIA slot (or from a PCMCIA card installed in the slot) to the I/O bus of the portable computer. The computer may also include one or more data storage devices, such as a hard disk drive, a floppy disk drive, and CD-ROM drive. In one embodiment, software used in connection with the present invention may be stored and distributed on a CD-ROM, which may be inserted into and read by the CD-ROM drive. The computer is also coupled to a display, and a user input device such as a mouse or keyboard.

A memory window can be created in the portable computer's address space into which memory and configuration registers of the PCMCIA card can be individually mapped. This memory window can be set up by a device driver of the PCMCIA card, and typically remains the same size and keeps the same memory location on the portable computer.

Figure 2:
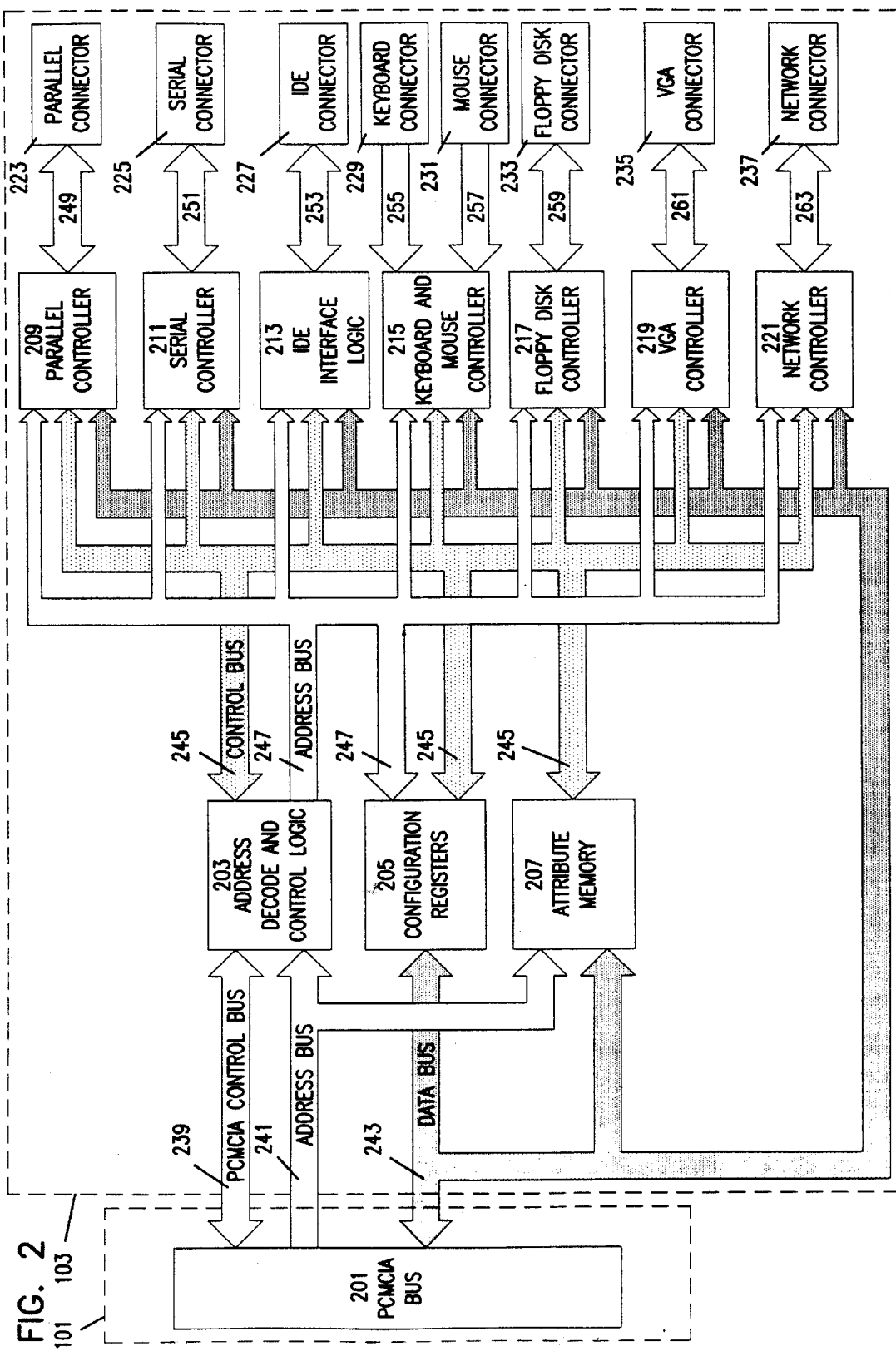
FIG. 2 is a more detailed block diagram of the docking station represented in FIG. 1.

Referring to FIG. 2, the docking station 103 interfaces to the computer 101 via a PCMCIA bus 201 on the computer 101. The computer 101 includes a PCMCIA slot or socket connected to the PCMCIA bus 201, into which a PCMCIA card can be inserted to connect the PCMCIA card to the PCMCIA bus 201. As used herein, a PCMCIA card refers, generically, to a standardized interface between a peripheral device and an internal bus of a computer. Typically, the PCMCIA card will be of a standard length and width, and will have a thickness determined by the card type (e.g., Type I=3.3 mm thick; Type II=5.0 mm thick; Type III=10.5 mm thick). The PCMCIA card is configured to fit into a PCMCIA slot or socket. When inserted into the PCMCIA slot or socket, the PCMCIA card can be connected to a wide variety of host buses, typically via host bus adapters designed for a particular bus interface. The PCMCIA bus 201 is an expansion of the computer's internal bus, and allows devices connected to the PCMCIA port to be accessed by the computer as if they were inside the computer. The PCMCIA physical interface allows for devices to be inserted and removed at any time from the computer.

The PCMCIA bus 201 operatively couples a PCMCIA control bus 239, an address bus 241 and a data bus 243 to core logic 202 of the docking station 103 to the computer 101. The core logic 202 includes address decode and control logic 203, configuration registers 205, and attribute memory 207.

In one exemplary embodiment, the address decode and control logic 203 is implemented using field programmable gate arrays (FPGA). Alternatively, the address decode and control logic 203 could be implemented using a program array logic (PAL) or other similar programmable devices or custom integrated circuits (IC) so long as the particular implementation can handle the timing requirements of the PCMCIA bus 201 as well as all of the peripheral devices 106 connected to the docking station 103.

In the exemplary embodiment, the configuration registers 205 contain five registers. The first configuration register is a standard PCMCIA register needed for all PCMCIA devices, commonly referred to as the configuration option register. This register contains 8 bits to enable the PCMCIA card to behave as an I/O card and also has a bit that resets the card to a known state. The second configuration register is a 16 bit register that contains the I/O address for the configuration registers of the different peripheral devices attached to the docking station 103. The third register is an interrupt flag which is an 8 bit register that contains a bit for each device to interrupt the computer for services. The fourth register is a 16 bit register that is loaded with the address for the IOIS16 signal used by the IDE interface. The IOIS16 is a signal used to inform the computer that a device desires to carry out a 16 bit transfer as opposed to an 8 bit transfer to the computer. The last register is a keyboard configuration register which is a 16 bit register that is loaded with the I/O address that the keyboard controller needs to be mapped to in the system.

In the above described exemplary embodiment, the configuration registers 205 are implemented using a field programmable gate array (FPGA). The configuration registers 205 could also be implemented using random access memory (RAM) or a programmable array logic (PAL) device. Different size registers may also be sued as dictated by the actual implementation.

The attribute memory 207 is implemented in the exemplary embodiment with an electronically erasable programmable read only memory (EEPROM) or other suitable standard nonvolatile memory. In one embodiment, only about 1024 bytes of memory are required to store all the values needed for the docking station 103.

Peripheral devices 106 can be connected to the docking station 103 through appropriate connectors (223–237). Once connected, the peripheral devices 106 interface through the address decode and control logic 203.

A parallel connector is connected through connection 249 to a parallel controller 209. The parallel controller 209 is connected to the address decode and control logic 203 via control bus 245 and address bus 247. Parallel controller 209 is also connected to configuration registers 205 with control bus 245 and address bus 247. A data bus 243 is linked to, and can provide data to, the configuration registers 205, the attribute memory 207, and the parallel controller 209. The parallel controller 209 may be implemented, for example, using a standard 8255 compatible parallel controller used on IBM XT/AT compatible computers. This supports the optional PS/2 bi-directional parallel port (SPP), the Enhanced Parallel Port (EPP) and the Extended Capabilities Port (ECP) modes. This interface is useful for connecting printers, removable media high density storage devices and scanners to the docking station 103. A Standard Microsystems Corporation (SMC) FDC37C93X Plug and Play Compatible Ultra I/O Controller includes a parallel port and can be used for this purpose.

A serial connector 225 is connected via connection 251 to a serial controller 211. The serial controller 211 is connected to the address decode and control logic 203, configuration registers 205 by way of control bus 245, address bus 247 and data bus 243, as indicated in FIG. 2. The serial controller 211 may be a NS16C550 compatible serial controller or other serial controller that can handle high speed communication (i.e., communication above 460K Baud), and has a built in FIFO for handling data received by the serial port at a rate faster than can be sent through the interface to the computer. The serial controller may be a standard 16C550 compatible Universal Asynchronous Receiver/Transmitter (UART), for example, with a 16 byte FIFO. The UART performs the serial-to-parallel conversion for receiving characters and the parallel-to-serial conversion for transmitting characters. This UART allows for data rates from 50 to 460.8K baud. The character options are programmable for 1 start; 1, 1.5 or 2 stop bits; even, odd, sticky or no parity; and prioritized interrupts. The UART contains a programmable baud rate generator that is capable of dividing the input clock or crystal by a number from 1 to 65535. The UART is also capable of supporting Musical Instrument Digital Interface (MIDI) data rate. An SMC FDC37C93X Plug and Play Compatible Ultra I/O Controller can be used for this purpose. Other serial controllers may also be used so long as they support a communications speed of 460K baud and contain a FIFO for handling data overflow.

An Integrated Drive Electronic (IDE) connector 227 is connected via connection 253 to IDE interface logic 213. The IDE enables hard disk drives with embedded controllers to be interfaced to the host processor. The IDE interface performs the address decoding for the IDE device. This interface also supports devices such as CD-ROM drives and newer high density removable storage devices. The IDE 213 includes an address decoder for the specific drive or mass storage device to be interfaced to, and interrupt circuitry to allow the device to request service from the computer. The interrupt source goes back through the control bus 245 through the address decode and control logic 203 back into the PCMCIA bus 201. In an exemplary embodiment, the SMC FDC37C93X Plug and Play Compatible Ultra I/O Controller provides the IDE interface.

A keyboard connector 229 is connected via connection 255 to a keyboard and mouse controller 215. A mouse connector 231 is also connected via connection 257 to the keyboard and mouse controller 215. The keyboard and mouse controller 215 interfaces through the control bus 245, address bus 247 and data bus 243. The keyboard and mouse controller 215 should contain means for communicating to a keyboard and a mouse and means for interfacing with a computer. The keyboard and mouse controller 215 may be implemented using a universal keyboard control with a standard Intel 8042 micro controller CPU core. The SMC FDC37C93X Plug and Play Compatible Ultra I/O Controller, for example, provides the keyboard and mouse controller 215. Other standard keyboard and mouse controllers may also be used.

A floppy disk connector 233 is connected to the floppy disk controller (FDC) 217 via connection 259. The FDC 217 is connected to the control bus 245, address bus 247 and data bus 243. An IBM compatible FDC can be used, and preferably one with a CMOS 755 floppy disk controller that supports a 2.88 megabyte super floppy drive. This FDC 217 can handle up to two floppy disk drives or tape backups. The FDC integrates the functions of the Formatter/Controller, Digital Separator, Write Precompensation and Data Rate Selection logic for IBM XT/AT compatible FDC are also provided. The true CMOS 765B core guarantees 100% IBM PC XT/AT computability in addition to providing data overflow and underflow protection. In an exemplary embodiment, the SMC FDC37C93X Plug and Play Compatible Ultra I/O Controller provides the FDC.

A VGA connector 235 is connected to a VGA controller 219 via connection 261. The VGA connector 235 interfaces through the control bus 245, address bus 247 and data bus 243. The VGA controller 261 can have some VGA memory integrated into it, support up to 1024 by 756 pixels, and be compatible with a super VGA monitor.

A network connector 237 is connected to a network controller 221 through connection 263. The network controller 221 interfaces through the control bus 245, address bus 247 and data bus 243. Between a 10 megabyte and a 100 megabyte controller can be supported. In the exemplary embodiment, the network controller 221 is an Ethernet controller.

As indicated, the keyboard and mouse controller 215, FDC 217, parallel controller 209, serial controller 211, and IDE interface 213 can be implemented using a Standard Microsystems Corporation (SMC) FDC37C93X Plug and Play Compatible Ultra I/O Controller. This device incorporates a keyboard interface, SMC's true CMOS 765B floppy disk controller, advance digital separator, 16 byte data FIFO, 16C550 compatible UARTs, a Multi-Mode parallel port and an IDE interface. The FDC37C93X also provides support for the ISA Plug-and-Play Standard (Version 1.0a) and provides for the recommended functionality to support Windows '95.

Most PCMCIA socket controllers designed into most computers have a limited I/O window size. Typically, only two I/O windows are permitted. This will allow for one or two functions to have I/O ports. With more than two functions on the docking station it is necessary to combine all of the I/O ports into two contiguous pieces of I/O memory.

Almost all of the functions on the SMC chip can be relocated in I/O address space via configuration registers. The only function that is fixed is the keyboard and mouse controller. To accommodate this a Xilinx FPGA is built into the hardware of the docking station. The Xilinx device includes logic to match an address and output the appropriate address to the SMC chip.

Figure 3:
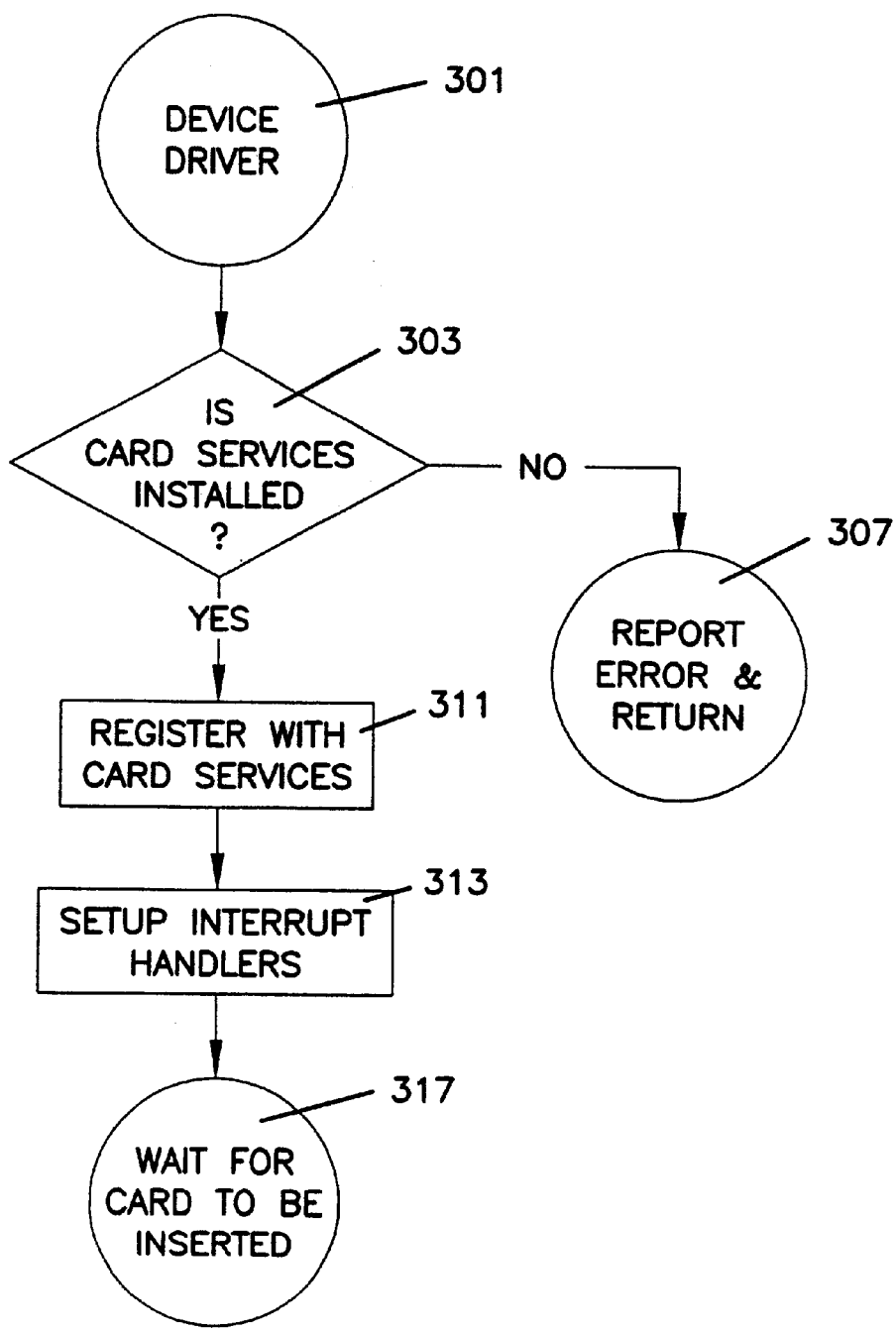
FIG. 3 is a flow chart showing a method of initializing a device driver into an operating system.

FIG. 3 shows a flow chart depicting steps performed in inserting the docking station device driver 301 into the RAM of the portable computer 101. Processing begins with decision step 303 which detects whether card services (a piece of software that is used to interface with the PCMCIA port at a high level) is installed on the computer; if not, an error is flagged at step 307, processing stops, and the device driver is not installed into the operating system. If card services is installed, processing continues with step 311 wherein the device driver registers with card services and sets up a call back handler, thereby allowing card services to inform the docking station device driver of events that happen in the PCMCIA port such as a PCMCIA card being inserted or removed. After the device driver is registered with card services, processing continues with step 313 which polls for interrupt vectors and loads the interrupt vectors into memory to allow the device driver to handle different functions of the docking station. Once in memory, the device driver stays in memory waiting for one of the callback events from card services to tell it that the docking station PCMCIA card has been inserted into the computer's PCMCIA port as shown in item 317.

The PCMCIA standard specifies that all PCMCIA devices must behave as a memory device until configured by the host computer. After configuration, the PCMCIA device must convert some of the interface pins to the PCMCIA bus to support the I/O interface. This is accomplished in one embodiment of the universal docking station 103 by using a Xilinx FPGA to control the functions of the flexible interface pins. All PCMCIA devices must also have memory on board that identifies the device's functions and capabilities. This is accomplished in the exemplary embodiment of the present invention by using a 2K EEPROM that is accessible by the computer at any time. The EEPROM also allows for software to write new information to it when upgrades or modifications are necessary.

Figure 4:
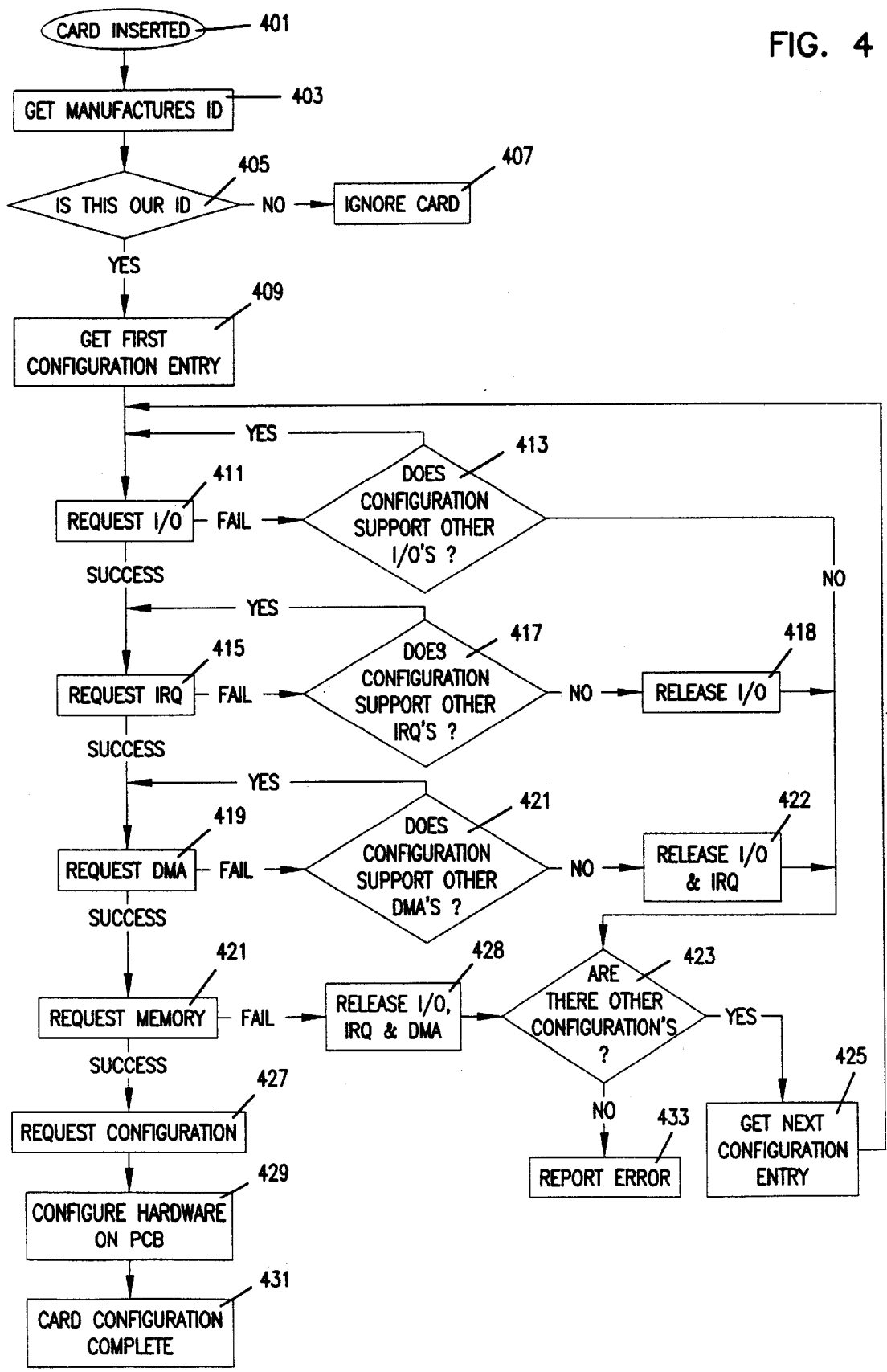
FIG. 4 is a flow chart of steps that occur in handling insertion of a PCMCIA card into a PCMCIA port of a computer.

FIG. 4 depicts the steps performed during card configuration. Processing begins at step 401 when a PCMCIA card is inserted into the PCMCIA port on the computer, and card services informs the device driver through the callback handler that a card has been inserted. Next, in step 403, the device driver asks card services for the manufacture ID of the card that was inserted. If the card inserted is the docking station PCMCIA card, the manufacturer ID is stored in attribute memory 207. In decision step 405, the manufacturer ID of the card inserted is compared to the ID designated for the docking station; if no match is found, the system ignores the card as shown in step 407 and continues waiting for another card to be installed. If the manufacturer ID is correct, processing continues with step 409 which gets the first configuration entry that is stored in the attribute memory on the card.

Next, the device driver tries to configure the I/O port and different interfaces needed for using the docking station card in the system given the particular configuration entry. The first step is the I/O port step 411 which is requested from card services and card services either allows the docking station card to have the I/O port or not. If not, the system will determine in decision step 413 whether the configuration allows other I/O ports to be used. If there are more I/O ports in this particular configuration, the system will return to step 411 to try requesting the next I/O port. This routine will continue until an I/O port is successfully requested or all I/O ports of this particular configuration entry are exhausted. If there are no more I/O ports in the particular configuration, decision step 423 determines whether there are other configurations available. If so, step 425 gets the next configuration entry and processing continues at step 411. If no other configurations exist, an error is reported at step 433.

If an I/O port is successfully requested in step 411, the processing will continue with step 415 which requests an interrupt. A similar process will happen with respect to the interrupt as with the I/O port; if the system does not get an interrupt, decision step 417 checks the configuration to see if another interrupt is allowed. If there is a possibility of another interrupt, it will go back and try to request the next interrupt. This process will continue until it either runs out of possible interrupts to try or it successfully allocates an interrupt for use with the docking station card. If it runs out of interrupts to try, step 418 releases the I/O port previously requested in step 411, and decision step 423 determines whether other configurations exist. If not, step 433 reports an error. If so, step 425 gets the next configuration entry and processing starts over at step 411.

If an interrupt is successfully requested in step 415, step 419 requests a direct memory address (DMA) channel. If the request fails, decision step 421 determines whether the configuration supports other DMA's. If so, step 419 will request that DMA, and this process will continue until it either runs out of possible DMAs or it successfully allocates a DMA channel. If decision step 421 determines that no more DMAs exist for the particular configuration, step 422 releases the I/O port and the interrupt, and moves to decision step 423 to determine if other configurations are available. If so, step 425 gets the next configuration and processing continues at step 411. If not, step 433 reports an error.

If a DMA channel is successfully requested in step 419, step 421 requests a memory block. If step 421 fails, step 428 releases the I/O port, the IRQ, and the DMA channel. Next, decision step 423 determines whether another configuration is available. If not, step 433 reports an error. If so, step 425 gets the next configuration entry and processing continues from step 411.

Upon successfully requesting the I/O, the IRQ, DMA and memory, step 427 requests configuration for the docking station, step 429 configures the hardware on the docking station board, and step 431 indicates that card configuration is complete.

Figure 5:
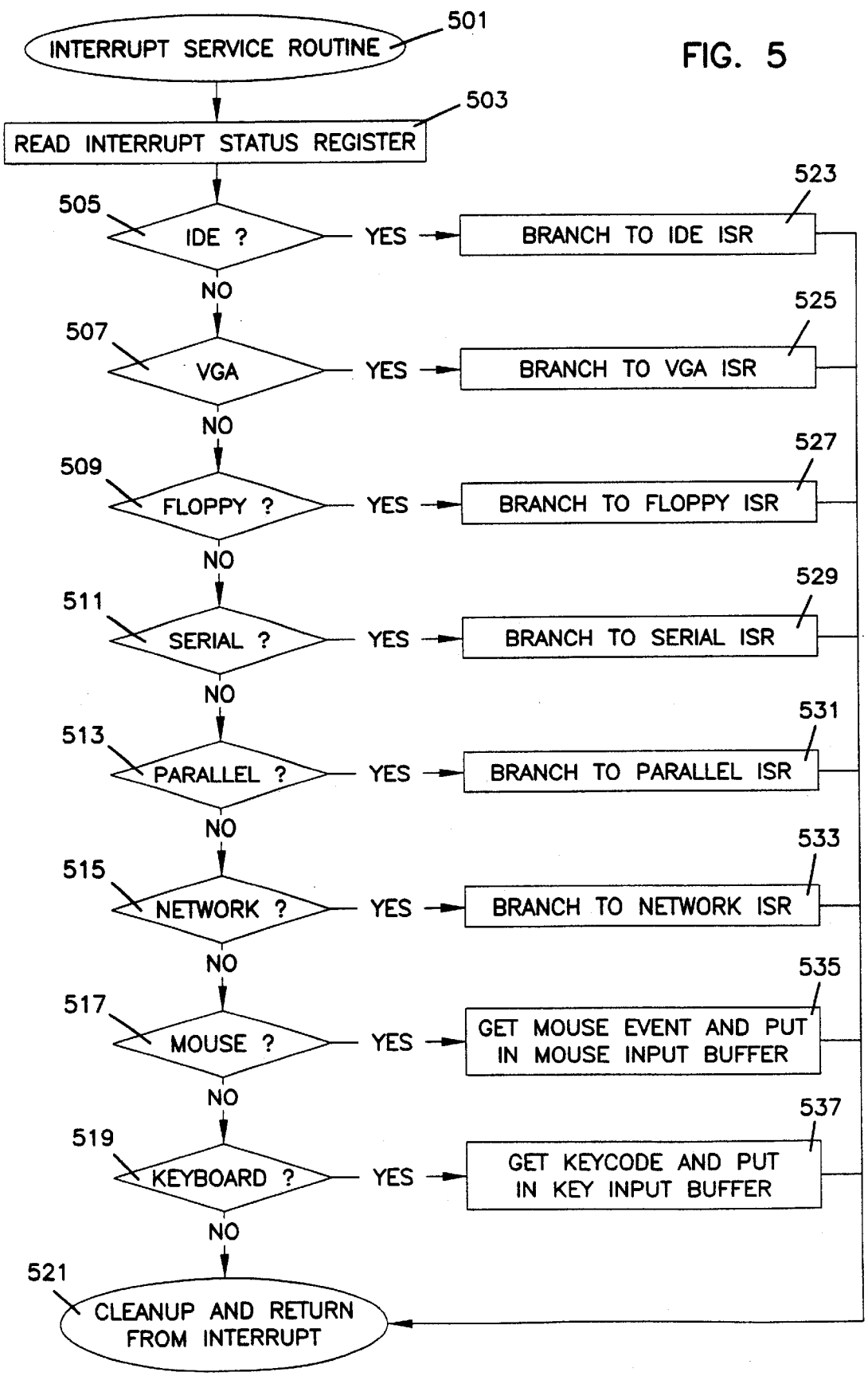
FIG. 5 is a flow chart of steps that occur when the docking station shown in FIG. 1 causes an interrupt on the computer requesting service for one of the peripheral devices.

FIG. 5 shows a flowchart of the interrupt service routine. The interrupt service routine comprises a series of steps performed when one of the peripheral devices 106 connected to the docking station 103 requests service from the computer 101 by setting its interrupt flag in the interrupt flag register of the control logic 203.

The PCMCIA specification and available controller hardware support only one interrupt per card. This presents a problem when more than one function on a card needs to interrupt the host computer for servicing. The PCMCIA 1995 specification solves this issue by having the card services (high level interface to PCMCIA devices for applications) handle the interrupts from a card. When a card is configured the card services starts with the first function and assigns it an interrupt if needed. Card services then stores the vector for this interrupt in a table and places its own interrupt vector in the appropriate memory location. When card services configures the next function on the card it stores that function's interrupt vector in the table next to the first function's interrupt vector. This continues until all functions are configured.

When an interrupt occurs, card services' interrupt handler is called from the vector in memory. Card services will then interrogate the PCMCIA cards interrupt status register to identify the source of the interrupt. Card services will then call the appropriate service routine for the function by calling the function pointed to by the vector in the stored table.

Step 503 reads an interrupt status register on the docking station 103. In a preferred embodiment, the interrupt status register will be in the configuration register 205 shown in FIG. 2, and have one bit in it for each function of the docking station 103. The interrupt service routine will then look at these bits and decide whether or not one of the devices is in need of service. If any of the devices connected to the expansion box set their interrupt flag in the interrupt flag register, the control logic 203 will then send the interrupt flag to the PCMCIA bus which will cause a hardware interface on the particular interrupt line that has been configured in accordance with FIG. 4.

After the interrupt service handler has read the interrupt status register, it decides which interrupts to handle in a prioritized fashion starting with the IDE interface in decision step 505, and proceeding downward in priority as shown in FIG. 5, until it reaches the keyboard which is lowest in priority. If decision step 505 determines that the flag is set for the IDE, then step 523 branches to the IDE interrupt service routine. Upon completion of this interrupt service routine, step 521 cleans up any registers that may have information pushed on to their stacks and returns from the interrupt. If the flag is not set for the IDE, decision step 507 determines whether the interrupt flag is set for the VGA. If so, step 525 branches to the VGA interrupt service routine.

If decision step 509 determines that the flag is set for the floppy disk controller, step 527 branches to the floppy interrupt service routine. If decision step 511 determines that the flag is set for the serial port, step 529 branches to the serial interrupt service routine. If decision step 513 determines that the flag is set to the parallel port, step 531 branches to the parallel port interrupt service routine. If decision step 515 determines that the flag is set to a network, step 533 branches to the network interrupt service routine. If decision step 517 determines that the flag is set to the mouse, step 535 gets the mouse event from the keyboard controller and puts it in the mouse input buffer. If decision step 519 determines that the flag was set by the keyboard, step 537 gets the keystroke from the input buffer of the keyboard controller and puts it into the BIOS input buffer of the operating system on the computer.

Although priority may be altered from that shown in FIG. 5, the priority shown has certain advantages over other possible schemes because of the relative speed of each device and the capability of the devices to hold data before being manipulated. Those devices that have room to store data for longer periods of time (e.g., keyboard) will be lower in priority than other devices which will throw away this information in a short period of time if it does not get taken out of the buffer.

An example of the serial controller 211 taking control of the PCMCIA bus 201 follows. The serial controller 211 would be configured to receive information from the serial connector 225 and would then send this data through the connections of 251 into the serial controller 211. The serial controller 211 would then request servicing to the computer 101 by setting the interrupt flag through the control bus 245 to the configuration registers 205. The configuration registers 205 would then set the interrupt flag through the control bus 245 to the address, decode and control logic 203 and the decode and control logic would send the signal through 239 to the PCMCIA bus 201.

Figure 6:
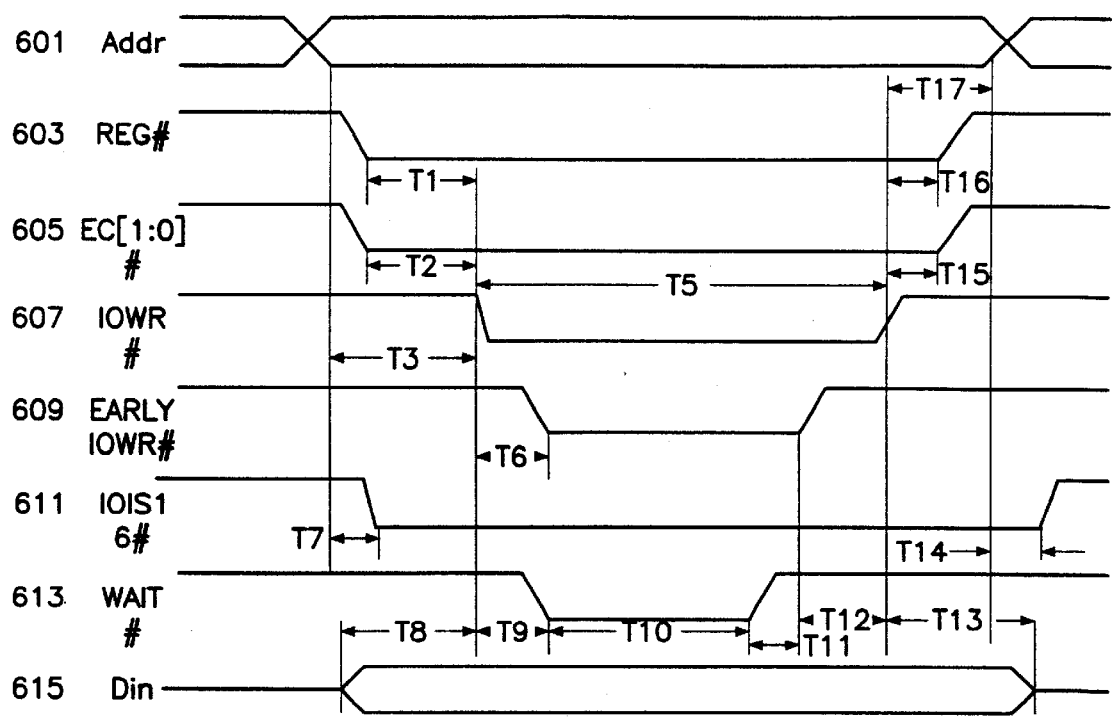
FIG. 6 is a timing diagram showing the write timing used to interface multiple peripheral devices to the PCMCIA port.

FIG. 6 shows a timing diagram for I/O write timing and illustrates a solution to the type of problems encountered when interfacing standard peripheral devices 106 to the PCMCIA port. Because PCMCIA was originally designed for memory devices, the specifications for interfacing with I/O devices are more constrained than other specifications for interfacing with I/O devices. Nonetheless, in order to interface with I/O devices through the PCMCIA port, one must somehow meet these constraints. This problem has been addressed conventionally by designing the I/O device with the PCMCIA constraints in mind, and, therefore, by designing the constraints right into the device. In contrast, the present invention allows the use of standard off-the-shelf devices that would normally be connected to the ISA (Industry Standard Architecture) bus of a computer, and use them on the PCMCIA bus. In other words, the PCMCIA interface is used in the present invention in a manner not contemplated by its design, and yet is also being used to interface off-the-shelf peripherals. The present invention addresses these competing interests.

Most IDE devices are designed to conform to the ANSI AT Attachment Interface for Disk Drives specification (ANSI X3.221-1994). This specification was designed to interface IDE devices directly to an Industry Standard Architecture (ISA) bus. This bus differs id some ways from the PCMCIA bus. In order to allow a standard IDE device to be connected to the docking station, the timing of some of the main control signals is modified since the timing constraints of a standard IDE device do not match that of the PC bus.

For example, the specification for PCMCIA does not require that the data bus be held active for any amount of time after a write signal goes high, but I/O devices need the data bus to be stable for a period of time after the I/O write signal goes inactive. The present invention overcomes this problem by extending the period of time the data bus is allowed to remain stable. In an exemplary embodiment, the period of time the data bus is allowed to remain stable is extended by activating early write signals.

To accomplish this task a Xilinx FPGA was designed into the hardware of the docking station. This device allows for a large amount of flexible glue logic to be utilized without taking up a large amount of printed circuit board real-estate and for a reasonable cost.

By way of example, if the computer 101 writes a byte of information to a peripheral device 106, e.g., the serial controller, the computer 101 first sets up the address bus signal 601. When the address bus signal 601 settles out and is determined to be the correct address as in the address and decode logic 203 in FIG. 2, the computer 101 waits for a short period of time and then either activates the IOIS16 signal 611 (for a 16 bit transfer) or does not activate the IOIS16 line 611 (for an 8 bit transfer). The IOIS16 signal 611 is used to inform the host computer that the IDE device would like to transfer 16 bits of data instead of 8. This signal is output from an IDE device and is active within 90 ns from the activation of a valid address. The PCMCIA spec requires this signal to be active within 35 ns of a valid address.

To overcome this problem the Xilinx FPGA on the docking station main printed circuit board (PCB) has a logic circuit in it to match the valid address and assert the IOIS16 line within the PCMCIA timing constraint.

Then the computer 101 activates the register signal 603 in the PCMCIA port. At about the same time, the computer activates CE[1:0] 605. CE[0] would be activated for an 8 bit transfer and both CE[1:0] would be activated for a 16 bit transfer. About a third period of time after that, the computer would activate the I/O write signal 607 letting the peripheral device that is addressed activate the address line 601, telling the device to set up the address line 601 of the data bus for the value that is going to be written to it. The Din signal 615 represents the data being sent by the computer. It settles out after a period of time. The peripheral device also sets the wait signal 613 to tell the computer to extend this write period for a longer period of time than a standard write. The Wait signal is another signal that could not meet the time constraints of the PCMCIA interface. This signal is asserted by an I/O device to inform the host computer that it needs more time to accomplish a task. The timing specs for PCMCIA and IDE both require this signal to be active within 35 ns. However, because all of the other timing critical signals must run through the Xilinx and other hardware on the PCB, this timing was not possible to meet. Therefore the Xilinx FPGA was used to activate an early wait signal. This signal delays the host computer by 100 to 500 ns to allow the other signals to settle.

At that point, the hardware on the docking station sets the early I/O write signal 609 so that the peripheral device, in this case the serial port, would see the actual write signal happen and on the other edge of that write signal (i.e., the rising edge) the device would then write the data on the data bus 615 into the particular register that is mapped out by the address bus 601. This early I/O write signal is activated a period of time before the actual I/O write signal occurs to allow the device to have valid data on the data bus 615 for a longer period of time. The I/O write signal then goes inactive, the CE[1:0] signal 605 goes inactive, and the read signals go inactive. Finally, the end of the address signal 601 becomes unstable.

Figure 7:
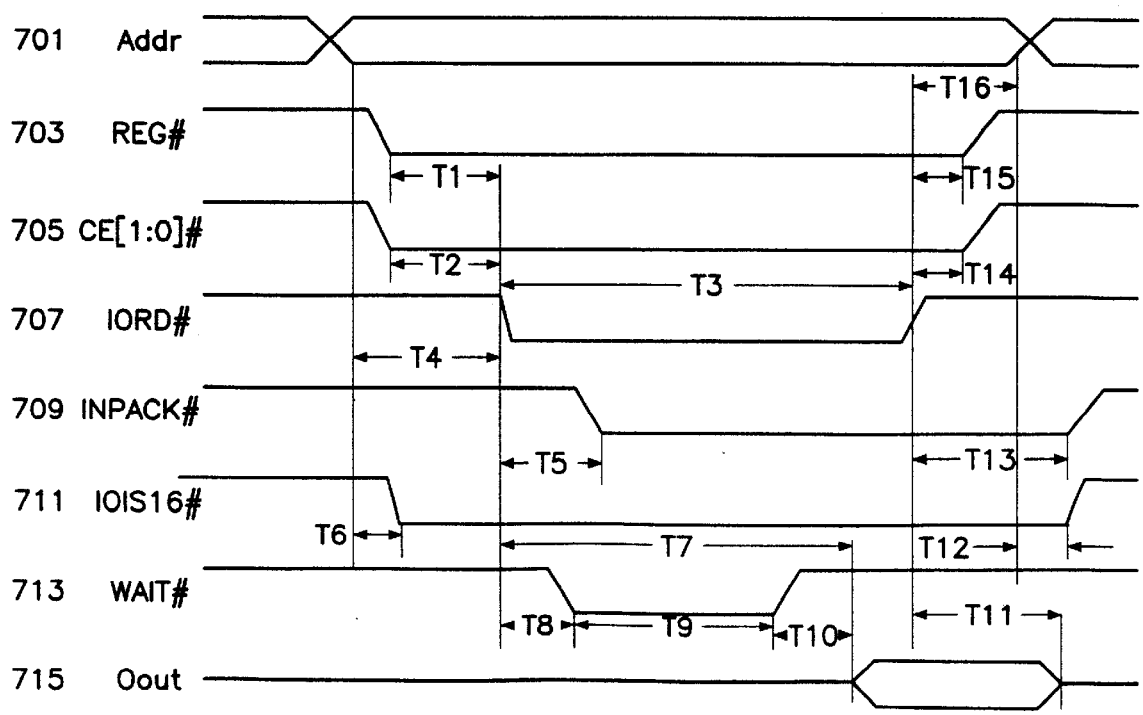
FIG. 7 is a timing diagram showing the read timing used to interface multiple peripherals to the PCMCIA port.

FIG. 7 shows a timing diagram showing the read timing used to interface with the PCMCIA port. The address bus 701 is the first signal to become stable and settle on the bus to indicate to the docking station 103 that one of the peripheral devices 106 on the docking station is to be addressed. The REG signal 703 then goes low and CE[1:0] (again, CE[0] would be activated for an 8 bit transfer and both CE[1:0] would be activated for a 16 bit transfer) becomes low. The control logic 203 in FIG. 2 activates the IOIS16 signal if a 16 bit transfer is desired for this particular read cycle. After the IOIS16, REG, and CE[1:0] signals have become low, the I/O read signal 707 would go low. This would indicate to the peripheral device (e.g., the serial port) that the computer wants to read information from it. The INPACK signal 709 would then go low to access a PCMCIA card register and notify the HBA that access belongs to the PCMCIA card. This allows the PCMCIA interface to drive the signal onto the internal bus of the computer. The docking station would then bring the wait signal 713 low to extend the time of the read cycle from the computer. This causes the computer to stretch out the read timing to allow the peripheral device to activate the data output 715 in a reasonable amount of time so that the computer can handle reading this information back and so that data would then become stable on the data bus. The read signal 707 would then be brought back high causing the computer to read in the information on the data bus. On completion of the actual read on the rising edge of the read signal 707, the CE[1:0] 705 and REG signals 703 would then be brought back high. The address signal 701 would then become unstable or start transitioning the next read value item 701 and a short time after that INPACK 709 and IOIS16 signal would be deactivated.

When the present invention is implemented without a VGA controller, a 16 bit PCMCIA port may be used. However, if a VGA controller is included in the docking station, a 32 bit PCMCIA port called "card bus" is preferable. This is because a 16 bit PCMCIA port runs at around 8 or 10 megahertz which is a fairly slow rate for updating video memory. A 32 bit PCMCIA port, however, runs at about 33 megahertz, which is similar to a PCI (Peripheral Component Interconnect) bus which is internal to computers. Interfacing the docking station to the card bus interface will provide for the wider bandwidth that is needed to handle video signals. The multiplexing and demultiplexing of the data and address lines must be properly adjusted to the PCMCIA standard chosen to ensure that the entire 16 (or 32) bit address and 16 (or 32) bit data are captured.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer system comprising:
    a) a portable computer having a PCMCIA interface, said portable computer capable of generating output signals for designated peripheral devices;
    b) a control unit having a PCMCIA interface interfacing with said portable computer bus;
    c) at least one peripheral device coupled to said PCMCIA interface;
    d) said control unit comprising
        i) means for converting said output signals from said portable computer into a form compatible with said designated peripheral device, and
        ii) means for routing said converted signal to said designated peripheral device without waiting for the end of any current transactions,
        iii) means for converting said input signal into a form compatible with said portable computer, and
        iv) means for prioritizing access to said PCMCIA bus by said input signals.

2. The computer system of claim 1 wherein the means for converting said output signal into a form compatible with said designated peripheral comprises extending the period of time the output signal remains stable.

3. The computer system as specified in claim 1 wherein said peripheral device comprises a user input device capable of generating an input signal, further comprising means for converting said input signal into a form compatible with said portable computer, and means for prioritizing access to said PCMCIA bus by said input signals.

4. A docking station for interfacing at least one of a plurality of peripherals to a portable computer having data on a bus and a PCMCIA interface, wherein the portable computer generates output signals for a designated peripheral, the docking station comprising:

a) a PCMCIA interface configured to communicate input and output signals with the bus of the portable computer;

b) means for converting the output signals generated by the portable computer to be compatible with the designated peripheral; and c) means for routing said converted output signals to said designated peripheral without waiting for the end of any current transactions.

5. The docking station as specified in claim 4 further comprising:

d) means for converting input signals generated by the peripheral device into a form compatible with the portable computer; and e) means for prioritizing access to said PCMCIA interface for receiving the input signals.

6. The docking station of claim 5 wherein the peripheral device is a user input device.

7. The docking station of claim 4 where the means for converting output signals generated by the portable computer into a form compatible with the designated peripherals comprises extending the period of time the output signals remain stable.

8. A method for interfacing a standard peripheral device to a computer having data on a bus via a PCMCIA bus, the method comprising the steps of:

a) providing data to be written to the peripheral device on the PCMCIA bus without waiting for the end of any current transactions; and b) writing the data to the peripheral device via the PCMCIA bus.

9. The method of claim 8 wherein the extending step is accomplished by activating the write signal a period before a standard write signal.

10. A universal docking station for connecting a portable computer to a plurality of peripheral devices, wherein at least one of the peripheral devices is a user input device, at least one of the user input devices is capable of receiving a write command, and the portable computer is capable of writing data, the docking station comprising;

a) a PCMCIA interface adapted to be coupled to a portable computer;

b) peripheral control units adapted to be coupled to the plurality of peripheral devices;

c) a docking station control unit coupled to the PCMCIA interface and the peripheral control units; and d) wherein the docking station control unit selectively transfers data between the PCMCIA interface and one of the peripheral control units without waiting for the end of any current transactions.

11. A computer system having data on a bus, comprising:

circuitry generating output signals for at least one peripheral device; and a control unit having a peripheral interface facilitating the interface of the computer to a peripheral device without regard to a state of the bus.

12. A computer system having data on a bus, comprising:

circuitry generating output signals for at least one peripheral device; and a control unit having a peripheral interface facilitating the interface of the computer to a peripheral device without regard to activity on the bus.

* * * * *